March 17, 1970 J. W. SCHWARTZ 3,501,583

APPARATUS FOR CORRECTING VERTICAL DRIFT IN COLOR TELEVISION INDEX TUBE

Filed Nov. 16, 1966

INVENTOR

JAMES W. SCHWARTZ

BY

Dawson, Tilton, Fallon, Lungmus & Alexander,

ATT'YS

United States Patent Office 3,501,583

Patented Mar. 17, 1970

3,501,583

APPARATUS FOR CORRECTING VERTICAL DRIFT IN COLOR TELEVISION INDEX TUBE

James W. Schwartz, Western Springs, Ill., assignor to National Video Corporation, Chicago, Ill., a corporation of Illinois Filed Nov. 16, 1966, Ser. No. 594,895
Int. Cl. H04n 5/44
U.S. Cl. 178—5.4 8 Claims

ABSTRACT OF THE DISCLOSURE

An electrical feedback system for correcting vertical drift in a color television receiver provided with electron beams scanning horizontal strips of color-producing phosphor. Index signals are superimposed on two of the video beams for generating an error signal representative of the vertical drift of the beams from a given set of horizontal strips, the amplitude of the index signals is modulated as an inverse function of the instantaneous amplitude of the video signal on its associated beam thereby eliminating intermodulation products due to the nonlinear transfer characteristic of the kinescope and permitting narrow band signal processing techniques to be employed in the feedback loop to enhance the signal to noise ratio of the feedback signal.

SUMMARY

This invention relates to color television apparatus; and, more particularly, to a color television system utilizing a plurality of sets of continuous, horizontal phosphor bands or strips wherein each strip within a set emits a different color of light responsive to an impinging electron beam.

The use of such horizontal strip-like elements has been recognized as having many advantages, particularly in the manufacturing aspects of color television tubes. The main problem in implementing a commercial system is the difficulty encountered in maintaining the horizontally sweeping video beams within the vertical limits of a group of the horizontal strip-like elements. Feedback control systems have been suggested for use in correcting the vertical drift of the beams carrying the video signal. One particular system, that which is described in the Sziklai et al. Patent No. 2,792,521, suggests adding separate index signals to two of the modulating grids on the main color beams to impinge on horizontal strips of ultraviolet-producing phosphor, and sensing phase shifts in respect to a reference signal to detect vertical displacements in the main color beams. An error signal is then generated representative of the displacement, and this error signal is fed to a separate vertical deflection system to correct the vertical position of the beams.

However, prior art systems have not developed to the point of practical commercial feasibility despite the significant production advantages to such systems, because they have not been able to obtain feedback error signals of sufficient signal to noise ratio for accurate control of the vertical drift.

The principal object of the present invention is to provide a color television system using a kinescope having horizontal strips of color-producing phosphor wherein therein is provision for feedback control of the vertical position of the beams relative to a given set of horizontal strips during scan which control is independent of the video content of the beams.

Another object of the present invention is to provide an improved pattern of the color-producing and ultraviolet-producing strips on the kinescope screen.

Still another object of the present invention is to provide an improved vertical drift control system for a color television receiver employing a kinescope having horizontal strips of color-producing phosphors on its screen by including a novel arrangement of the impinging electron beams relative to the ultraviolet-producing phosphor strips for rendering the feedback system insensitive to variations in beam cross section.

Other advantages and objects of the present invention will be obvious to those skilled in the art from the following detailed description accompanied by the attached drawing in which.

DESCRIPTION

Figure 1:
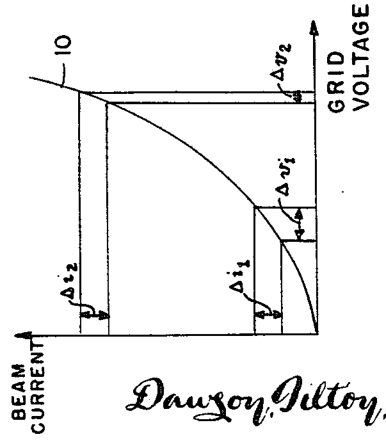
FIG. 1 is a typical plot of the dynamic transfer characteristic of a color kinescope.

As mentioned above, the particular problem sought to be overcome by the present invention in the use of horizontal strips of color-producing phosphor on the face of the kinescope is the production of a feedback error signal suitable for vernier deflection of the beams. Referring to FIG. 1, the line 10 represents the relationship between applied grid voltage and resultant beam current of the kinescope. A problem arises in some of the previously suggested systems in that, normally, one of the video signals has a greater intensity relative to the others due to a predominance of the former color in the image. When this is the case, equal increments of applied grid voltage (an index signal, for example) will result in increasingly larger beam current as the operating point of the grid voltage (the video signal) increases. That is, a small perturbation of the grid voltage will produce a much higher corresponding change in the beam current with increased intensity of the beam. Consequently, if the amplitude of an index signal superimposed on a video beam is kept constant, the nonlinear characteristic of the kinescope will cause intermodulation of the index signal thereby requiring broad band techniques to be used in the feedback loop. Since the amplitude of the index signal is normally much less than the amplitude of its associated video signal (in order to prevent spurious images on the screen) the use of such broad band feedback signal techniques will reduce the signal to noise ratio of the feedback signal to a point at which it is impossible to distinguish it from the video signal within that bandwidth.

Hence, generally, what the present invention seeks to do is to control the amplitude of the index signals as an inverse function of the intensity of the video signal such that as the operating point of the index signal moves up along the curve 10 of FIG. 1 with increased video intensity, the amplitude of the applied index voltage will decrease. This will prevent intermodulation of the index signal and allow a narrow band feedback signal having enhanced signal to noise ratio.

Figure 2:
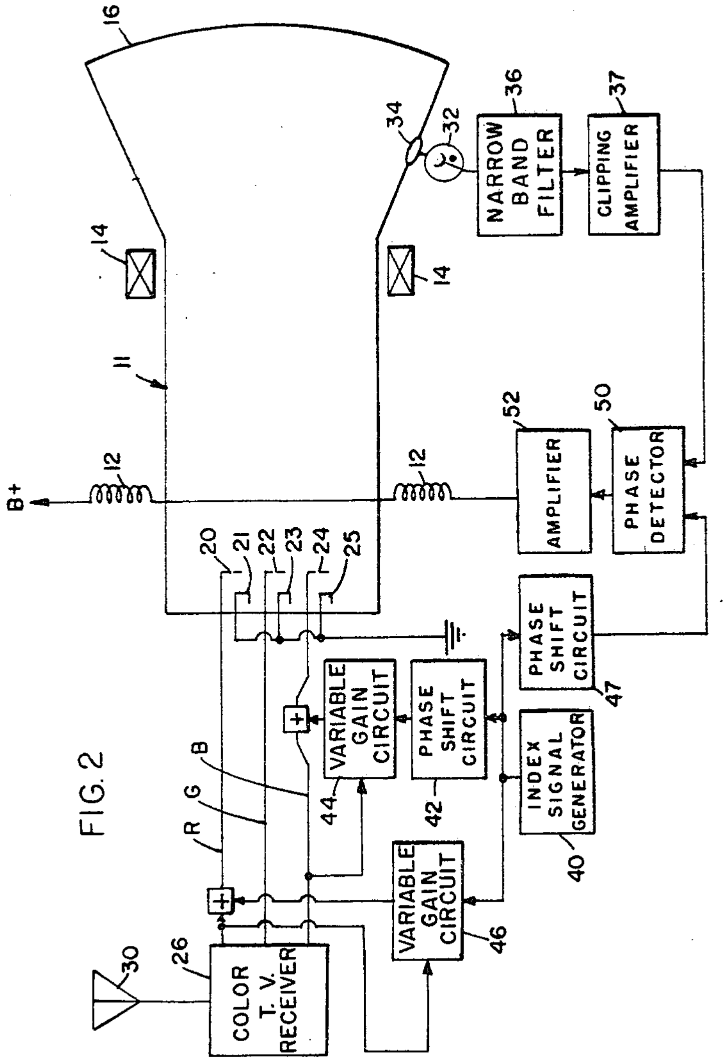
FIG. 2 is a schematic diagram, partially in functional block form, of apparatus according to the present invention.

Referring now to FIG. 2, the color kinescope is indicated generally at 11. The vertical deflection coil for vernier correction of vertical drift is indicated generally at 12. The kinescope 11 is conventionally provided with a main deflection yoke 14 and the horizontal strips appear on the inside of the viewing face or screen 16. Broadly, the arrangement of the strips may take any of the forms already known, but a preferred arrangement of the strips and pattern of the beams relative thereto is set out below.

The kinescope 11 is provided with three control grids 20, 22 and 24 which modulate cathodes 21, 23 and 25, respectively, with the red, green and blue video signals from a conventional color TV receiver, shown in block diagram form as 26, which receives the input composite video signal from an antenna 30.

Figure 4:
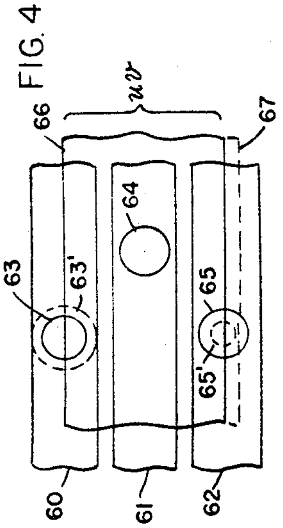
FIG. 4 illustrates an arrangement of beams on the color-producing and ultraviolet-producing phosphors on the screen of the kinescope for reducing the sensitivity of the system to beam intensity.

The beams controlled by the grids 20, 22 and 24 are focused to impinge on and scan horizontal strips of phosphor selected to produce light corresponding to the video signal of its associated beam. A plurality of such groups are arranged in a repeating vertical pattern on the screen. Also provided is at least one strip of ultraviolet-producing phosphor in register with each group of color-producing phosphors. One such arrangement is illustrated in FIG. 4 and will be described in more detail below.

Ultraviolet light produced by impingement of the beams on the horizontal strips of ultraviolet-producing phosphor in register with the color-producing strips is detected by a photocell 32 placed adjacent an opening in the kinescope 11, as indicated at 34. The output signal of the photocell 32 is an electrical signal responsive to the instantaneous scintillations produced on the ultraviolet-producing phosphor. This signal is fed through a narrow band filter 36 to a clipping amplifier 37.

An index signal generator 40 generates a constant frequency, constant amplitude signal preferably of 5.4 megacycles which is superimposed on two of the video beams, as mentioned before. The output of the index signal generator 40 is fed through a conventional phase shift circuit 42 which provides a 120° phase shift from the output of index signal generator 40. This delayed signal is then fed through a variable gain circuit 44 to the grid 24 which contains the blue video signal. The output of index signal generator 40 is also fed to the grid 20 containing the red video signal directly through a variable gain circuit 46.

The reference signal for detection of vertical drift of the beams is obtained from a second phase shift circuit 47 receiving the output of generator 40 and shifting it one half the amount of the shift of phase shift circuit 42 plus the delay required for the index signal to propagate through the kinescope and sensing and clipping circuits. This reference signal is fed into a conventional phase detector 50 along with the output of clipping amplifier 37. A linear amplifier 52 receives the output of phase detector 50, which is an error signal representative of the vertical drift of the beams relative to a given set of color-producing strips, and drives the correction coils 12, as shown.

Figure 3:
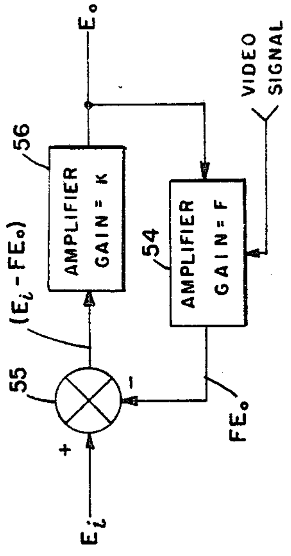
FIG. 3 is a block schematic diagram of the variable gain circuit of FIG. 2.

Each of the variable gain circuits 44 and 46 of FIG. 2 may take the form of the circuits illustrated schematically in FIG. 3 wherein $E_i$ represents the input index signal and $E_o$ represents the associated composite signal on the grid of the color beam. An amplifier 54 having a gain of F receives $E_o$ and algebraically combines its negative amplified by a factor F. This is represented schematically at 55. A second amplifier 56 having a gain of K receives the signal combined at 55, multiplies it by the factor K and couples it to the grid of the color beam. The signal at the input to amplifier can be seen from inspection as being equal to $E_i - FE_o$, from which it is seen that:

$$E_o = K(E_i - FE_o) \text{ and } E_o = E_i\left(\frac{K}{1+FK}\right)$$

$$E_o \approx \frac{1}{F} E_i \text{ if } KF \gg 1$$

Hence the output is an inverse function of the gain of amplifier 54. If amplifier 54 is then chosen to have the same transfer characteristic as the kinescope (i.e. the curve 10 of FIG. 1), the resultant index signal is amplitude-modulated to produce an index beam current of constant amplitude independent of the video content of the beam. Hence, there is no intermodulation of the index signal which may be thought of as algebraically superimposed on the video signal, and a narrow band feedback signal of enhanced signal to noise ratio is used for correction of vertical drift. Narrow band filter 36 is tuned to the frequency of the index signal generator 40, and it preferably has a high Q or low loss. Clipping amplifier 37 eliminates amplitude variation in the feedback signal.

In practice, the transfer characteristic of the kinescope (reference numeral 10 of FIG. 1) may be varied by adjustment of the voltage on the $G_2$ grid such that all in a lot have the same characteristic, as is well known in the art. In this case, the transfer characteristic of the kinescope is the familiar vacuum tube power curve, and the element 54 of FIG. 3 may be a simple vacuum tube triode with the modulating video signal coupled to its grid. With the system thus described, the index beam current ($\Delta i_1$ and $\Delta i_2$ of FIG. 1) is constant and independent of the video signal.

In FIG. 4 is seen a preferred arrangement of one set only of the color-producing and ultraviolet-producing strips. A horizontal strip for producing red light responsive to an impinging electron beam is indicated at 60; one for producing green light at 61; and one for producing blue light at 62. The electron beams associated with each of the strips 60, 61 and 62 are indicated respectively at 63, 64 and 65. The particular pattern which the dots bear to one another is not important, and it may be assumed they are moving to the right in the drawing.

A strip of ultraviolet-producing phosphor 66 is seen as being in vertical register with the set of color-producing strips and extending from midway of the red strip 60 to midway of the blue strip 62.

The two beams which carry the index signals are the red beam 63 and the blue beam 65. For purposes of illustration, the beams are all shown as solid circles of equal diameter. This, of course, assumes that the current or intensity of each beam is the same, which is far from the usual case. If the intensity of the red beam increases, its diameter will correspondingly increase, as shown in dash at 63'; a reduced intensity blue beam is similarly shown at 65'.

Since each of the index beam currents is equal and superimposed on the video beam, it can be seen that with this unique feature of having the center of the indexed beams move along the edge of the ultraviolet-producing phosphor, that the amount of index beam current which is incident on the ultraviolet-producing phosphor is always one half the index beam current independent of the intensity of its associated beam current as long as the beams are in proper vertical register with the set of color-producing phosphors. This arrangement of beams and phosphors compensates for variations in video content of the beams which would otherwise cause a secondary dependence of the feedback signal on the video content in addition to the intermodulation effect described above.

It will be appreciated that any two of the beams may be indexed, and that the phosphors of those beams which are indexed need not be separated by the phosphor of the one that is not.

A better appreciation of the compensation scheme just described might be obtained if one imagined, for instance, that the lower horizontal edge of the ultraviolet-producing phosphor 66 extended three quarters of the way down the blue color-producing phosphor 62, as shown in dash at 67 of FIG. 4. It will be noted that even though the beams have not drifted vertically, the beam of reduced intensity 65' will generate more index signal than will the more intense beam 65 since the larger beam falls partly off the ultraviolet-producing phosphor thereby causing false feedback signals.

Persons skilled in the art will be able to practice the principle of my invention by substituting circuits and arrangements equivalent to those which I have shown; and it is intended that such modifications be covered as they are embraced within the spirit and scope of the appended claims.

What is claimed is:

1. In a color television system including a kinescope having means for directing a plurality of electron beams to scan sets of horizontal color-producing strips on its screen, each set including a color-producing phosphor associated with each of said beams, the combination comprising: means for generating first and second index signals; a first variable gain means receiving said first index signal for modulating it in inverse relation to the video signal on a first beam and for coupling said modulated index signal to said first beam; a second variable gain means receiving said second position signal for modulating it in inverse relation to the video signal on a second beam and for coupling said modulated index signal to said second beam; and means responsive to said indexed beams for generating an error signal representative of the vertical drift of said beams from a set of said strips.

2. The system of claim 1 further comprising deflection means receiving said error signal for correcting said vertical drift of said beams responsive to said error signal.

3. The system of claim 1 wherein each of said variable gain means comprises a first amplifier driving a video line; a second amplifier receiving its associated video signal; means receiving the output signal of said second amplifier and one of said index signals for subtracting the first named signal from the second named signal and coupling the resultant signal to the input of said first amplifier, the transfer characteristic of said second amplifier being representative of the transfer characteristic of said kinescope whereby the index beam current is constant and independent of the video content of its associated beam.

4. The system of claim 2 further comprising an ultraviolet-producing phosphor strip in register with each set of said color-producing phosphor strips on said screen; means including a sensor receiving ultraviolet light from said ultraviolet-producing phosphor strips responsive to said index signals for generating a signal representative of the vertical drift of said electron beams; and means for correcting the drift of said beams responsive to said error signal.

5. The system of claim 4 characterized by each of said indexed beams having its center move along the edge of said ultraviolet-producing phosphor strip when said beams are in proper registration relative to said color-producing phosphor strips whereby said sensed signal is compensated for variations in beam width.

6. In a color television image reproducing system including a kinescope having means for directing a plurality of electron beams and a plurality of sets of horizontal color-producing strips on its screen, intercepting said beams, the combination comprising:

ultraviolet-producing elements on said screen in register with each set of said color-producing strips and intercepting said beams;

a reference signal generator;

a first variable gain component receiving the output signal of said generating means for coupling it to a first of said beams;

means receiving the video signal of said first beam and for varying the gain of said first variable gain component in inverse relation thereto;

phase shifting means receiving the output of said generating means for shifting the phase thereof;

a second variable gain component receiving the output signal of said phase shifting means for adding it to a second of said beams;

means receiving the video signal of said second beam for varying the gain of said second variable gain component in inverse relation thereto;

sensing means including a photocell receiving ultraviolet light from said ultraviolet-producing elements for generating a narrow band signal representative of the vertical displacement of said beams relative to said ultraviolet-producing elements; and correction means receiving said displacement signal for correcting the vertical location of said beams.

7. The system of claim 6 characterized by the fact that the signals on said first and second beams from said first and second variable gain components produce resultant beam currents superimposed on the video signal which resultant currents are constant and independent of the intensity of the video signals.

8. The system of claim 7 characterized by said first and second beams having a symmetrical orientation relative to the edge of said ultraviolet-producing elements when said beams are in proper vertical register with said color-producing strips.

References Cited

UNITED STATES PATENTS

| | | | |
|---|---|---|---|
| 2,577,368 | 12/1951 | Schultz et al. | 178—5.4 |
| 2,587,074 | 2/1952 | Sziklai | 178—5.4 |
| 2,792,521 | 5/1957 | Sziklai et al. | |
| 2,798,900 | 7/1957 | Bradley. | |
| 2,840,635 | 6/1958 | Burns. | |
| 2,934,600 | 4/1960 | Schwartz et al. | |
| 3,041,391 | 6/1962 | Chatten. | |

JOHN W. CALDWELL, Primary Examiner

R. P. LANGE, Assistant Examiner

U.S. Cl. X.R.

315—22

PO-1050
(5/69)

UNITED STATES PATENT OFFICE
CERTIFICATE OF CORRECTION

Patent No. 3,501,583 Dated March 17, 1970

Inventor(s) James W. Schwartz

It is certified that error appears in the above-identified patent and that said Letters Patent are hereby corrected as shown below:

In claim 4, line 7, after the word "the" and before the word "vertical" please insert -- composite ultraviolet light produced by said first and second index signals; means receiving said composite signal for generating an error signal representative of the --.

SIGNED AND
SEALED
JUL 28 1970

(SEAL)
Attest:

Edward M. Fletcher, Jr.
Attesting Officer

WILLIAM E. SCHUYLER, JR.
Commissioner of Patents